United States Patent [19]

Yoshimura et al.

[11] 4,356,513

[45] Oct. 26, 1982

[54] CCD SCANNER WITH IMPROVED RESOLUTION

[75] Inventors: Norihiko Yoshimura; Masaaki Niiho; Shoji Kamasako, all of Tsurugashima; Hideyuki Ishiai, Tokyo, all of Japan

[73] Assignee: Asahi Kogaku Kogyo Kabushiki Kaisha, Tokyo, Japan

[21] Appl. No.: 237,811

[22] Filed: Feb. 24, 1981

[30] Foreign Application Priority Data

Feb. 26, 1980 [JP] Japan .................................. 55-23126

[51] Int. Cl.³ ............................................... H04N 3/14
[52] U.S. Cl. ................................... 358/213; 235/454; 340/146.3 AH; 358/293; 358/294
[58] Field of Search ....................... 358/213, 293, 294; 340/146.3 AH; 235/440, 454, 470, 456, 455

[56] References Cited

U.S. PATENT DOCUMENTS

| | | | |
|---|---|---|---|
| 4,127,877 | 11/1978 | Morishita et al. | 358/213 |
| 4,203,136 | 5/1980 | Wellendorf et al. | 358/280 |
| 4,268,867 | 5/1981 | Traino | 358/285 |

Primary Examiner—Robert L. Richardson
Attorney, Agent, or Firm—Sughrue, Mion, Zinn, Macpeak & Seas

[57] ABSTRACT

A video signal composing circuit and method for aligning scanned CCD's in an optical reading device in which plural scanned CCD's are arranged in a line parallel to a reading surface. Clock pulses are counted which correspond to the scanning of the CCD's and compared with values set by plural switch groups. The outputs of the comparison circuits are coupled through a logic circuit which combines and gates the individual video output signals from the CCD's to produce a composite video signal which is free of overlap in video signals between adjacent CCD's.

6 Claims, 7 Drawing Figures

CCD SCANNER WITH IMPROVED RESOLUTION

BACKGROUND OF THE INVENTION

The present invention relates to an optical reading device using a plurality of self-scanning type solid photoelectric elements each composed of a plurality of photodiodes hereinafter referred to as "CCD's". More particularly, the invention relates to an electronic circuit which composes video signals outputted by the CCD's without duplicating or omitting them.

Following the development of CCD's, a miniaturized device for optically reading patterns such as characters and drawing figures has been proposed. Due to improvements in techniques of manufacturing CCD's with a high density, a device for optically reading a wide range has been proposed. The number of bits in CCD's available commercially at present is typically 128, 256, 512, 1024 or 2048. Accordingly, if it is required to provide an optical reading device capable of operating over a wide range, it is impossible for one CCD to cover the full range. In order to overcome this difficulty, it is necessary to employ a technique whereby a pattern such as a character or a figure is read with a plurality of CCD's and the output video signals of the CCD's are composed into a series of video signals. For instance in the case where a figure of size AO is read with a resolution of 8 lines/mm (0.125 mm/bit), it is necessary to use a CCD having 6728 (=841/0.125) bits. Even if commercially available CCD's having the highest number of bits are used, it is necessary to use four CCD's. In the case where a plurality of CCD's are arranged in a line to read patterns such as characters or figures optically, techniques of accurately dividing and composing video signals of adjacent CCD's covering a common reading range or field of vision must be employed. In this case, the distance between the ends of the reading ranges of the CCD's must be equal to the bit interval of the CCD's and it is necessary to divide and compose the video signals so that they do not overlap. If the video signals are not accurately adjusted in time, the resultant image will have overlapping portions or omitted portions at positions corresponding to the junctions of the video signals of the photoelectric elements. As a result, it is difficult to provide a pattern reading device which operates with a high precision.

In order to prevent the occurrence of overlapping or omitted portion in a resultant image, heretofore adjustment was carried out by moving the CCD's in the longitudinal direction of the elements. Accordingly, it is necessary to use an adjustment mechanism which is accurate enough to match the bits corresponding to the junctions of the video signals of the CCD's. The operation of the adjustment mechanism is considerably difficult because the duplication or omission of the video signals occurs approximately at bit intervals of $10\mu$.

Accordingly, an object of the invention is to eliminate the above-described difficulties. More specifically, an object of the invention is to provide a video signal composing circuit in which it is unnecessary to use a conventional adjustment mechanism and a conventional difficult adjustment method, in which the video signals can be readily and accurately divided and composed merely by an electrical process, and in which the reading ranges of the CCD's can be selected as desired.

SUMMARY OF THE INVENTION

In accordance with these and other objects of the invention, there is provided a video signal composing circuit for an optical reading device for reading patterns of characters and figures with a plurality of scanned CCD's arranged in a line parallel to a reading surface including a plurality of switch groups for setting corresponding output codes, counter circuit means for counting scanning clock pulses supplied to the CCD's, a plurality of comparison circuit operatively coupled to the counter circuit means for comparing output codes set by the switch groups with a count output of the counter circuit means, flip-flop circuits having an input coupled to output coincidence signals from the comparison circuits, and a gate circuit operating in response to outputs of the flip-flop circuits and video signals outputted by the CCD's for producing a single composite video signal. The switch groups are preferably divided between those of a start bit set circuit and a reading range bit set circuit with separate comparison circuit means being provided in each of these and with one comparison circuit being provided for each of the CCD's in each of the start bit set circuit and reading range bit set circuit. The outputs of the flip-flop circuits are coupled to a set of AND gates in the gating circuit to the other inputs of which are applied outputs from another set of flip-flop circuits which produce output signals representing the scanning time of the corresponding CCD's. The outputs of these AND gates are coupled through a first OR gate to a first input of a second AND gate to the second input of which is coupled the ORed digital output signals from the various CCD's.

The invention further encompasses methods for aligning the CCD's using these circuits. To align the CCD's, they are first coarsely mechanically aligned. After the mechanical alignment, a video signal composing pattern having alternating vertical and horizontal stripes is placed so as to be scanned by the CCD's. The output signals from the various CCD's are examined and the number of clock pulses corresponding to the distance between adjacent vertical stripes is determined and the switch means set accordingly so that there is no overlap in the composite output video signal.

DESCRIPTION OF THE PREFERRED EMBODIMENTS

The invention will be described with reference to a preferred embodiment.

Figure 1:
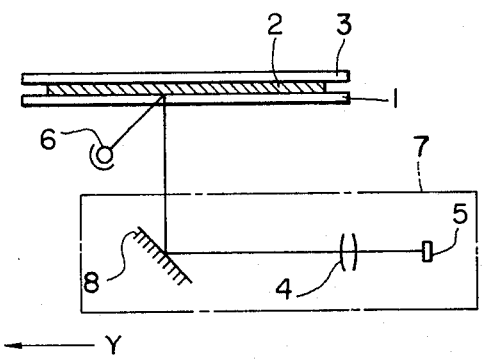
FIG. 1 is a sectional view showing an example of an optical reading device.
Figure 2:
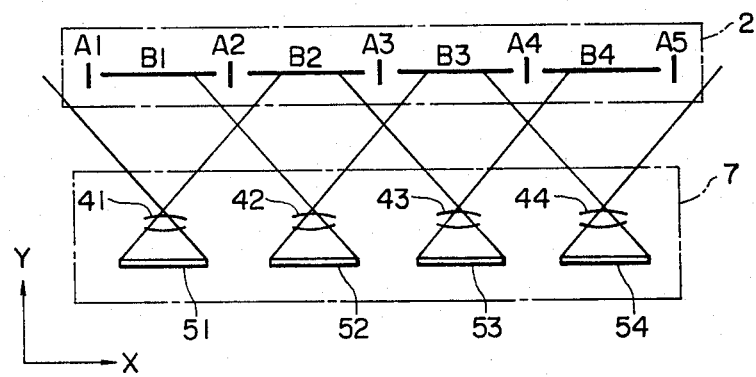
FIG. 2 is a plan view of the optical reading device in FIG. 1.

FIGS. 1 and 2 show an optical system in which four 2048-bit CCD's each having a resolution of 8 lines/mm are employed with the length of the shorter side of size AO (841 mm) as the CCD reading range in the scanning direction. FIG. 1 is a sectional view of a reading optical system and FIG. 2 shows the positional relationships between a reading pattern and the CCD's.

A video signal composing pattern 2 is placed on a transparent glass plate or a reading surface 1 and the pattern 2 is illuminated by a lamp 6. Light reflected from the pattern 2 is applied through a mirror 8 and lenses 4 to the CCD's so that the image of the pattern 2 is formed on the CCD's. As shown in FIG. 2, the image is formed in a division mode on the CCD's 51 through 54 by means of the lenses 41 through 45. The lenses and CCD's arranged as four optical systems form a single optical system block 7 which is scanned in the direction of the large side of an AO size sheet by a mechanical device such as an electric motor. In this connection, hereinafter the CCD scanning direction, i.e. the direction of the shorter side of the AO size sheet, is referred to as the "X direction" and the scanning direction of the optical system block 7, i.e. the direction of the longer side of the sheet, as the "Y direction".

Figure 4:
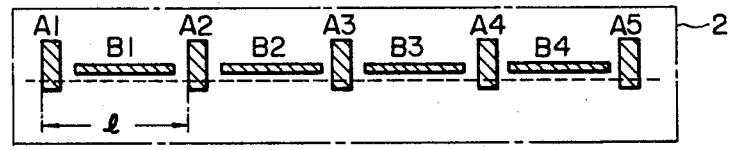
FIG. 4 is an explanatory diagram showing an example of a video signal composing pattern.

The video signal composing pattern 2 is shown in FIG. 4 in detail. In accordance with the video signal composition technique of the invention, a part of FIG. 4 indicated by the broken line is used. Patterns B1 through B4 are used for adjustment between the optical systems and photoelectric elements such as the angular adjustment of the photoelectric elements. The pattern width of each of the patterns A1 through A5 should be selected so that a video signal of at least one bit can be detected. The video signal composing pattern 2 must be prepared with a high precision. For this purpose, a black and white pattern is used which is printed on a photographic film by a photographic process such as is done in photo-drafting. The black and white pattern is set on the reading surface 1 with the black patterns A1 through A5 oriented parallel to the Y direction and the black patterns B1 through B4 oriented perpendicular to the Y-direction. The white portion of the video signal composing pattern 2 shown in FIG. 4 is transparent. Therefore, a cover 3 made of a material which can totally reflect light is placed on the video signal composing pattern 2.

The number (N) of clock pulses synchronous with video signals detected between the patterns A1 and A2 which are read by one CCD can be represented by the following equation (1):

$$N = l/\phi_O = m_O l/P \quad (1)$$

where $l$ is the pitch of the black patterns A1 and A2, $m_O$ is the image formation magnification of the optical system, $P$ is the pitch of the photodiode array in one CCD, and $\phi_O$ is the reading resolution. In order to minimize the measurement error, the pitch $l$ should be set to the largest range which can be read by one CCD.

In the case where the four optical systems are out of adjustment due to the magnifications of the optical systems being somewhat different from one another, the following counter-measure can be taken:

If the image formation magnifications for adjacent CCD's are represented by $m_1$ and $m_2$, respectively, the reading resolutions by $\phi_1$ and $\phi_2$, the numbers of clock pulses corresponding to the duplicated video signal by $N_1$ and $N_2$, and the length of the duplicated video signal on the reading surface by $S$, and if the synchronous clock pulse numbers $n_1$ and $n_2$ bits in a binary-coded video signal which is provided by reading a black pattern having a length L are provided for the image formation magnifications $m_1$ and $m_2$, respectively, then:

$$S = N_1 \phi_1 = N_2 \phi_2,$$

$$L = n_1 \phi_1 = n_2 \phi_2, \text{ and}$$

$$P = m_1 \phi_1 = m_2 \phi_2, \quad (2)$$

where $n_1 > n_2$, and $N_1 > N_2$.

Accordingly:

$$N_1 - N_2 = \frac{S}{L}(n_1 - n_2) \quad (3)$$

Since video signal composition is carried out with $L >> S$, even if the reading ranges of the CCD's are different by $(n_1 - n_2)$ bits from each other as indicated in expression (3), the video signal error $(N_1 - N_2)$ in the duplicated pattern is not greatly affected thereby. For instance in the case where L=206 mm and S=50 mm, then $N_1 - N_2 = 0.24 (n_1 - n_2)$, and with $(n_1 - n_2) = 4$ bits, $N_1 - N_2 \approx 1$ bit.

However, it should be noted that $(n_1 - n_2)$ is adjusted to ±2 to 3 in the optical system adjustment. Therefore, the value S can be selected in the range of $S \leq L/(n_1 - n_2)$ instead of $S/L(n_1 - n_2) \leq 1$ which can overcome sufficiently the somewhat degraded accuracy of the optical systems.

In the video signal composing method according to the invention, based on the measurement of the number (N) of bits which is the count value of the number of clock pulses calculated from equation (1), i.e. the number of clock pulses corresponding to the video signals, the effective range of the video signal is extracted so that the video signals can be divided or composed in such a manner that the video signal is not duplicated between the CCD's.

The procedure of dividing and composing the video signals will be described.

The video signal composition is carried out once the optical systems shown in FIG. 1 have been adjusted according to conventional mechanical and optical techniques and the video signal composing pattern 2 has been so positioned that it can be read by the CCD's 5. In positioning the CCD's 5 with respect to the lenses 4, the CCD's 5 may be positioned coarsely with respect to the reading patterns perpendicularly to the optical axes of the lenses 4. It is one of the merits of the invention that this operation need be done only coarsely. Thus, the CCD's 51 through 54 can be positioned in ranges where they can read the patterns A1 and A2, A2 and A3, A3 and A4, and A4 and A5, respectively.

Figure 3:
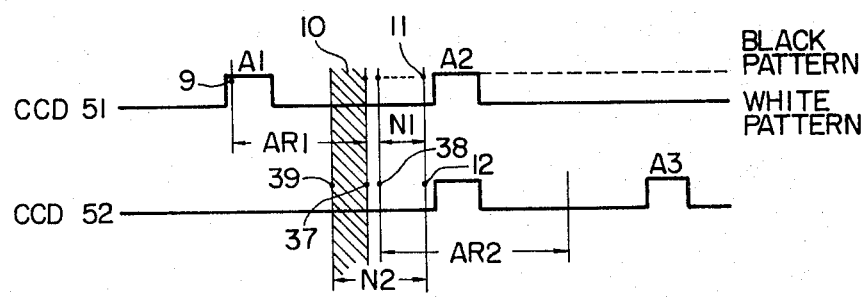
FIG. 3 is a timing chart showing binary-coded video signals for a description of a video signal composing technique of the invention.

FIG. 3 shows binary-coded video signals which are provided by reading the video signal composing pattern 2 with the CCD's 51 through 54. The video signals of the black patterns A1–A2, A2–A3, A3–A4 and A4–A5 are detected by the CCD's 51 through 54, respectively. By way of example, the video signal dividing and composing technique of the invention will be described with reference to the two CCD's 51 and 52.

Figure 6:
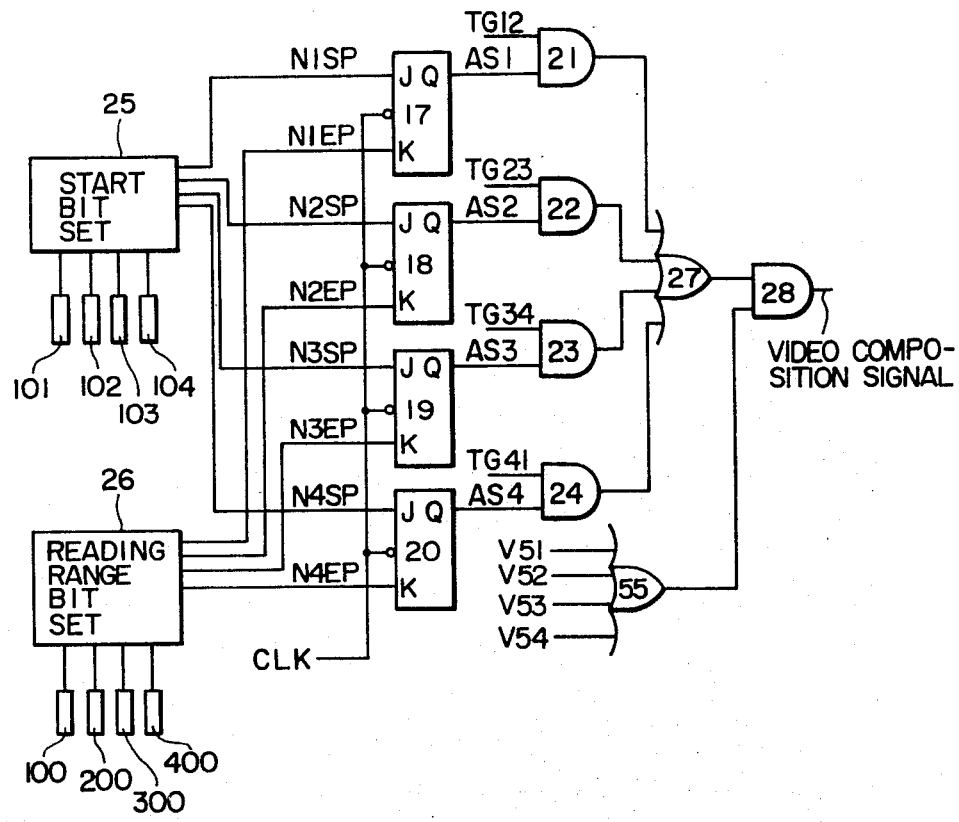
Figure 7:
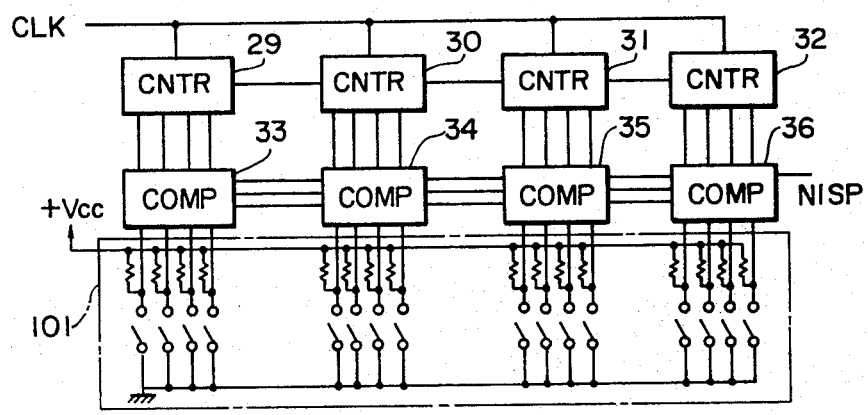

The effective reading ranges of the video signals detected by the CCD's 51 and 52 are from a start bit $N_{1s}$ to an end bit $N_{1e}$ and from a start bit $N_{2s}$ to an end bit $N_{2e}$. The video signal is detected in synchronization with a clock signal CLK. In the video signal detected by the CCD 51 for which an image formation magnification $m_O$ is used, the point 9 on the rising waveform of the pattern A1 is detected as the start bit $N_{1s}$. If there are totally $a_1$ bits in the effective reading range AR1 of the CCD 51, then for the CCD 51 the effective reading range AR1 is from the start bit $N_{1s}$ to the end bit $N_{1e}=N_{1s}+a_1-1$. The start bit $N_{1s}$ and the total bits $a_1$ can be set by a switch group 101 as shown in FIG. 6 which can output binary-coded hexadecimal signals. The switch group 101 is illustrated in FIG. 7 in more detail. During periods in which a particular switch in the switch group 101 is not closed, the output signal of the switch is at the same level +Vcc as that of the power source, which is the level of the black pattern. When the switch is closed, its output signal is at the same level as that of the white pattern.

Then, the number N1 of bits from the $(N_{1e}-1)$-th bit to the bit corresponding to the point 11 in the vicinity of the rise of the video waveform of the pattern A2 is obtained. This number N1 of bits can be measured on a synchroscope. However, it can be more readily measured using a counter for a binary-coded video signal with which the distance between particular patterns can be measured for the video signal composing pattern 2 only by using the video signals A1 through A5 and the signals $N_{1s}$, $N_{1e}$, $N_{2s}$ and $N_{2e}$. In the effective reading range AR1 of the CCD 51, the shaded portion 10 is read by the CCD 52 also. Accordingly, the start bit $N_{2s}$ of the effective reading range AR2 of the CCD 52 must be the bit 38 which is next to the end bit 37 in the shaded portion 10. Therefore, if the number of clock signals CLK provided during the period of from the first bit 39 of the CCD 52 to the point 12 of the pattern A2, here represented by $N_2$, is counted with a counter, then as in the case of the CCD 51, the start bit $N_{2s}$ can be set by means of a switch group 102 with $N_{2s}=N_2-N1$ (N1 being obtained in the case of the CCD 51).

If it is assumed that there are totally $a_2$ bits in the effective reading range AR2 of the CCD 52, then the end bit $N_{2e}$ of the effective reading range AR2 is the $(N_{2s}+a_2-1)$-th bit.

Similar to the above-described cases, the video signals duplicately detected by the CCD's 52 and 53 can be readily divided by operating switch groups 103 and 104 without shifting or eliminating even one bit.

The invention will be further described with reference to FIGS. 5 through 7 which show a video signal composing circuit according to the invention.

Figure 5:
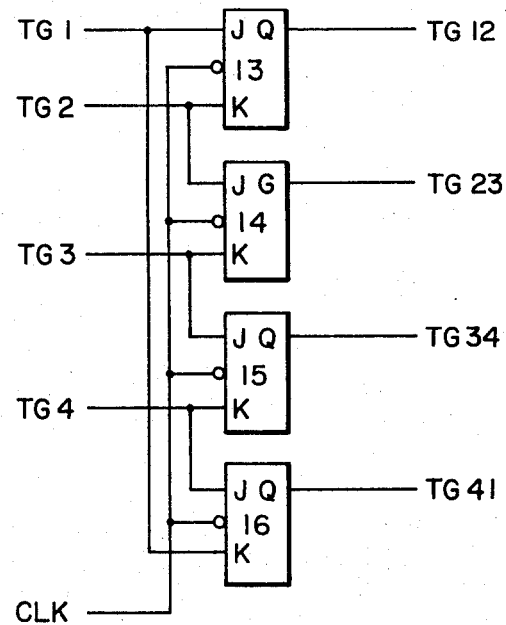
FIGS. 5, 6 and 7 are circuit diagrams showing a video signal composing device according to the invention.

In FIG. 5, reference character TG1 designates a start signal for the CCD 51 and TG2 a signal for starting the CCD 52 slightly after the CCD 51 has been started. The signal TG2 is provided after all the bits of the CCD 51 starting with the timing of the preceding signal TG1 have been scanned. Similarly, start signals TG3 and TG4 are provided for the CCD's 53 and 54. These signals TG1 through TG4 are applied to flip-flop circuits 13 through 16 which in response thereto generate output signals TG12, TG23, TG34 and TG41, respectively. The signals TG12 through TG41 are employed as the selection signals of the CCD's.

In the case where a 4-digit number in decimal notation is set by the switch group 10 in FIG. 7, a binary-coded hexadecimal output signal is applied to comparison circuits 33 through 36 where it is compared with the output signals of counter circuits 29 through 32. When the binary-coded hexadecimal output signal reaches the set value of the switch group 101, the comparison circuit 36 outputs a pulse signal N1SP. Since the number of CCD's required is four, it is necessary to provide four such circuits of like construction, that is, four circuits each including four comparison circuits should be provided. However, the above-described counters 29 through 32 can be commonly used for all the CCD's. The above-described four circuits form an effective reading range start bit setting block 25 which outputs signals N1SP, N2SP, N3SP, and N4SP. An effective reading range bit number setting block 26 operates to set effective reading range $a_1$ bits, $a_2$ bits, etc. for the CCD's. The arrangement of the effective reading range bit number setting block 26 is similar to that of the effective reading range start bit setting block 25. In the block 26, effective reading bit numbers for the CCD's 51 through 54 are set by operating switch groups 100, 200, 300 and 400, to provide output signals N1EP, N2EP, N3EP, and N4EP.

In order to form signals representative of the effective reading ranges AR1, AR2, etc. of the CCD's, the signals N1SP, N2SP, N3SP and N4SP and the signals N1EP, N2EP, N3EP and N4EP are applied to the J terminals and the K terminals of flip-flop circuits 17 through 20, respectively, as a result of which the flip-flop circuits 17 through 20 output signals AS1, AS2, AS3 and AS4 corresponding to the effective reading ranges AR1, AR2, etc., respectively. These signals AS1 through AS4 and the CCD selection signals TG12, TG23, TG34 and TG41 are applied to AND circuits 21 through 24, respectively. The output signals of the AND circuits 21 through 24 are applied to an OR circuit 27. The outer signal of the OR circuit 27 and the binary-coded video signal are applied to an AND circuit 28 as a result of which finally a composite video signal is provided as the output signal of the AND circuit 28.

The binary-coded video signal is obtained by applying to an OR circuit 55 video signals V51 to V54 which are binary-coded output signals from the CCD's 51 to 54. The video signals V51 to V54 are not generated simultaneously because the CCD's 51 to 54 are electrically scanned in order in response to signals TG1, TG2, TG3 and TG4, as shown in FIG. 5 for starting the CCD's 51 to 54, respectively.

As is apparent from the above description, in accordance with the technique of dividing and composing a video signal which is duplicately detected by the photoelectric elements in an optical reading device of the invention, purely electrical means is employed instead of the conventional mechanical means of finely adjusting the photoelectrical elements. Therefore, the holders for mounting the photoelectric elements can be simplified, which results in a low manufacturing cost. Furthermore, in accordance with the invention, as the measurement of a video signal is employed, the video signal can be divided and composed suitably irrespective of fluctuations in focal lengths of the lenses and variations in setting of the optical systems. The effective reading ranges of the photoelectric elements can be electrically selected as desired according to the invention. Therefore, for instance in reading a given area in the direction of the shorter side of a sheet of size A0, the desired area can be selected without using post processing or software. As the video signals detected by the photoelectric elements are divided and composed with a high accuracy by a simple switching operation as described above, various operations related to the video signal adjustment as well as maintenance can be quickly achieved.

What is claimed is:

1. A video signal composing circuit for an optical reading device for reading patterns of characters and figures with a plurality of scanned CCD's arranged in a line parallel to a reading surface, comprising:
  a plurality of switch groups for setting corresponding output codes;
  counter circuit means for counting scanning clock pulses supplied to said CCD's;
  a plurality of comparison circuits operatively coupled to said counter circuit means for comparing said output codes set by said switch groups with a count output of said counter circuit means;
  flip-flop circuits having inputs coupled to output coincidence signals of said comparison circuits; and
  a gating circuit operating in response to outputs of said flip-flop circuits and video signals outputted by said CCD's for producing a single composite video signal.

2. A video signal composing circuit for an optical reading device for reading patterns of characters and figures with a plurality of scanned CCD's arranged in a line parallel to a reading surface, comprising:
  a plurality of first flip-flop circuits, one of said flip-flop circuits being provided for each of said CCD's, each of said flip-flop circuits having a J input coupled to a signal for starting the scanning of a corresponding CCD and a K input coupled to a signal for starting a subsequent adjacent CCD, clock inputs of each flip-flop circuit of said first plurality of flip-flop circuits being connected in common;
  counter circuit means for counting scanning clock pulses supplied to said CCD's;
  a plurality of first comparison circuits, one of said comparison circuits being provided for each of said CCD's, each of said first comparison circuits having first inputs coupled to outputs of said counter circuit means;
  a plurality of first switch means coupled to second inputs of said plurality of first comparison circuits for setting digital values thereon;
  a plurality of first comparison circuits having first inputs coupled to said outputs of said counter circuit means;
  a plurality of second switch means, one of said switch means being coupled to second inputs of a corresponding one of said comparison circuits of said plurality of second comparison circuits for setting digital values thereon;
  a plurality of second flip-flop circuits, one of said flip-flop circuits of said plurality of second flip-flop circuits being provided for each of said CCD's, each flip-flop circuit of said plurality of second flip-flop circuits having a J input coupled to an output of a corresponding one of said comparison circuits of said plurality of first comparison circuits and a K input coupled to an output of a corresponding one of said comparison circuits of said plurality of second comparison circuits, said flip-flop circuits of said plurality of second flip-flop circuits having clock inputs coupled commonly to the clock signal supplied to said clock inputs of said flip-flop circuits of said plurality of first flip-flop circuits;
  a plurality of first AND gates, one of said AND gates being provided for each flip-flop circuit of said plurality of second flip-flop circuits, each of said AND gates having a first input coupled to a Q output of a corresponding one of said flip-flop circuits of said plurality of second flip-flop circuits and a second input coupled to a Q output of a corresponding one of said flip-flop circuits of said plurality of first flip-flop circuits;
  a first OR gate having inputs coupled to outputs of each of said first AND gates;
  a second AND gate having a first input coupled to an output of said first OR gate; and
  a second OR gate having an input coupled to output video signals from each of said CCD's, an output of said second OR gate being coupled to a second input of said second AND gate, an output video signal being formed on an output of said second AND gate.

3. A method for composing video signals from a plurality of scanned CCD's comprising the steps of providing:
  a plurality of switch groups for setting corresponding output codes;
  counter circuit means for counting scanning clock pulses supplied to said CCD's;
  a plurality of comparison circuits operatively coupled to said counter circuit means for comparing said output codes set by said switch groups with a count output of said counter circuit means;
  flip-flop circuits having inputs coupled to output coincidence signals of said comparison circuits; and
  a gating circuit operatively in response to outputs of said flip-flop circuits and video signals outputted by said CCD's for producing a single composite video signal;
  coarsely mechanically aligning said CCD's;
  providing a video signal composing pattern comprising alternating patterns of vertical and horizontal stripes;
  setting said switch means such that said composite video signal includes no overlap of video signals from adjacent CCD's.

4. The method of claim 3 wherein said step of setting said switch means comprises determining a number of clock pulses applied to said CCD's between video outputs representing said vertical stripes and setting said switch means in accordance with the number of clock pulses so determined.

5. A method for composing video signals from a plurality of scanned CCD's comprising the steps of providing:
  a plurality of first flip-flop circuits, one of said flip-flop circuits being provided for each of said CCD's, each of said flip-flops having a J input coupled to a signal for starting the scanning of a corresponding CCD and a K input coupled to a signal for starting a subsequent adjacent CCD, clock pulses of each flip-flop circuit of said plurality of first flip-flop circuits being connected in common;
  counter circuit means for counting scanning clock pulses supplied to said CCD's;
  a plurality of first comparison circuits, one of said comparison circuits being provided for each of said CCD's, each of said first comparison circuits having first inputs coupled to outputs of said counter circuit means;
  first switch means coupled to second inputs of said plurality of first comparison circuits for setting digital values thereon;
  a plurality of second comparison circuits having first inputs coupled to said outputs of said counter circuit means;

a plurality of second switch means, one of said switch means being coupled to second inputs of a corresponding one of said comparison circuits of said plurality of second comparison circuits for setting digital values thereon;

a plurality of second flip-flop circuits, one of said flip-flop circuits of said plurality of second flip-flop circuits being provided for each of said CCD's, each flip-flop circuit of said plurality of second flip-flop circuits having a J input coupled to an output of a corresponding one of said comparison circuits of said plurality of first comparison circuits and a K input coupled to an output of a corresponding one of said comparison circuits of said plurality of second comparison circuits, said flip-flop circuits of said plurality of second flip-flop circuits having clock inputs coupled commonly to the clock signal supplied to said clock inputs of said flip-flop circuits of said plurality of first flip-flop circuits;

a plurality of first AND gates, one of said AND gates being provided for each flip-flop circuit of said second plurality of flip-flop circuits, each of said AND gates having a first input coupled to a Q output of a corresponding one of said flip-flop circuits of said plurality of second flip-flop circuits and a second input coupled to a Q output of a corresponding one of said flip-flop circuits of said plurality of first flip-flop circuits;

a first OR gate having inputs coupled to outputs of each of said first AND gates;

a second AND gate having a first input coupled to an output of said first OR gate; and a second OR gate having an input coupled to output video signals from each of said CCD's, an output of said second OR gate being coupled to a second input of said second AND gate, an output video signal being formed on an output of said second AND gate; coarsely mechanically aligning said CCD's;

providing a video signal composing pattern comprising alternating patterns of vertical and horizontal stripes; and setting said switch means such that said composite video signal includes no overlap of video signals from adjacent CCD's.

6. The method of claim 5 wherein said step of setting said switch means comprises determining a number of clock pulses applied to said CCD's between video outputs representing said vertical stripes and setting said switch means in accordance with the number of clock pulses so determined.

* * * * *